(12) United States Patent
Tani et al.

(10) Patent No.: US 7,168,240 B2
(45) Date of Patent: Jan. 30, 2007

(54) CONTROL APPARATUS FOR AN INTERNAL COMBUSTION ENGINE

(75) Inventors: Hideaki Tani, Tokyo (JP); Kuen Yehliu, Tokyo (JP); Keiichi Enoki, Tokyo (JP); Tadahiro Azuma, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/196,422

(22) Filed: Aug. 4, 2005

(65) Prior Publication Data

US 2006/0090456 A1    May 4, 2006

(30) Foreign Application Priority Data

Oct. 28, 2004  (JP) ............................. 2004-314301

(51) Int. Cl.
*F01N 3/00*  (2006.01)

(52) U.S. Cl. ............................ 60/285; 60/276; 60/277; 701/103

(58) Field of Classification Search ................ 60/274, 60/276, 877, 285, 286; 701/103, 109
See application file for complete search history.

(56) References Cited

U.S. PATENT DOCUMENTS

| | | | | |
|---|---|---|---|---|
| 6,073,440 A | * | 6/2000 | Douta et al. | 60/277 |
| 6,116,021 A | * | 9/2000 | Schumacher et al. | 60/274 |
| 6,148,611 A | * | 11/2000 | Sato | 60/274 |
| 6,619,032 B2 | * | 9/2003 | Kakuyama et al. | 60/277 |
| 6,637,194 B2 | * | 10/2003 | Kakuyama et al. | 60/285 |
| 6,694,726 B2 | * | 2/2004 | Sakai | 60/277 |

FOREIGN PATENT DOCUMENTS

| | | |
|---|---|---|
| JP | 5-209510 A | 8/1993 |
| JP | 2812023 B2 | 8/1998 |
| JP | 2002-130018 A | 5/2002 |

* cited by examiner

*Primary Examiner*—Binh Q. Tran
(74) *Attorney, Agent, or Firm*—Sughrue Mion, PLLC

(57) ABSTRACT

A control apparatus for an internal combustion engine can detect degradation of a three-way catalyst with high accuracy without causing deterioration in an exhaust. A pair of first and second air fuel ratio detectors are disposed in an exhaust system at locations upstream and downstream of the three-way catalyst for detecting a first and a second air fuel ratio of an exhaust gas. A target oxygen change amount calculator calculates a target oxygen change amount of the three-way catalyst, and an oxygen change amount calculator calculates an oxygen change amount of the three-way catalyst from an amount of exhaust gas passing through the three-way catalyst and the first air fuel ratio. An air fuel ratio operator inversely controls the air fuel ratio to a rich side and a lean side with a prescribed air fuel ratio width each time the oxygen change amount reaches a target oxygen change amount.

2 Claims, 6 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine with a three-way catalyst for purification of exhaust gas installed on an exhaust system, and more particularly, it relates to a new technique to detect the degradation of the three-way catalyst in a reliable manner.

2. Description of the Related Art

In general, in internal combustion engines, a three-way catalyst is used to purify harmful components of an exhaust gas. The three-way catalyst has an oxygen occlusion capability to keep the atmosphere inside the three-way catalyst at a stoichiometric air fuel ratio by occluding oxygen in the exhaust gas when the air fuel ratio of the exhaust gas is leaner than the stoichiometric air fuel ratio, while releasing the oxygen occluded therein when the air fuel ratio of the exhaust gas is richer than the stoichiometric air fuel ratio.

In addition, the three-way catalyst also has a capability to oxidize HC and CO among three harmful components contained in the exhaust gas and to reduce NOx, thereby purifying these respective components into harmless gases. Further, since the purification ability of the three-way catalyst becomes maximum in the vicinity of the stoichiometric air fuel ratio, the exhaust gas is excellently purified by combining the oxygen occlusion ability and the purification ability of the three-way catalyst with each other.

However, when the exhaust gas becomes leaner than the stoichiometric air fuel ratio to cause the amount of oxygen occluded in the three-way catalyst to exceed the oxygen occlusion capacity thereof, the atmosphere in the three-way catalyst becomes no longer kept at the stoichiometric air fuel ratio, so the NOx purification rate of the catalyst is deteriorated to a remarkable extent.

In addition, when the exhaust gas becomes richer than the stoichiometric air fuel ratio so the amount of oxygen occluded in the three-way catalyst becomes lacking or insufficient, the atmosphere in the three-way catalyst can not be kept at the stoichiometric air fuel ratio, thus deteriorating the purification rate of HC and CO. Here, it is known that as the three-way catalyst is deteriorated, the oxygen occlusion capacity thereof decreases, thus worsening the purification performance thereof.

Accordingly, there has been proposed a control apparatus for an internal combustion engine in which a pair of air fuel ratio sensors are arranged at an upstream side and at a downstream side, respectively, of a three-way catalyst so as to directly measure an oxygen occlusion capacity thereof to detect the degradation of the three-way catalyst (see, for instance, a first patent document: Japanese patent No. 2812023). In this case, in changes of the air fuel ratios at the upstream and downstream sides of the three-way catalyst and in a change of the concentration of harmful components in the exhaust gas at the downstream side of the three-way catalyst, the air fuel ratio at the upstream side of the three-way catalyst is switched from a predetermined air fuel ratio, which is preset to a lean side, into a first prescribed air fuel ratio, which is preset to a rich side, across the stoichiometric air fuel ratio.

At this time, even if the air fuel ratio at the upstream side of the three-way catalyst changes into the rich side, the oxygen adsorbed and held in the three-way catalyst is released. As a result, the air fuel ratio at the downstream side of the three-way catalyst is first maintained at the stoichiometric air fuel ratio only for a first predetermined period of time, and thereafter reaches a first air fuel ratio which is at the rich side. Subsequently, the air fuel ratio at the upstream side of the three-way catalyst is switched from the predetermined air fuel ratio, which is preset at the rich side, into a second prescribed air fuel ratio, which is preset at the lean side, across the stoichiometric air fuel ratio.

At this time, oxygen is adsorbed and held in the three-way catalyst, contrary to the above case. As a result, the air fuel ratio at the downstream side of the three-way catalyst is first maintained at the stoichiometric air fuel ratio only for a second predetermined period of time, and thereafter reaches the second air fuel ratio at the lean side. Hereinafter, an absolute amount of the oxygen adsorbed and held by the three-way catalyst is calculated from a difference between the switched air fuel ratio and the stoichiometric air fuel ratio, and from the amount of the exhaust gas that has passed through the three-way catalyst for the first or second predetermined period of time, so that the degradation level of the three-way catalyst is detected from the absolute amount of adsorbed oxygen thus calculated (see FIG. 6 of the above-mentioned first patent document).

In the known control apparatus for an internal combustion engine as referred to above, after the amount of oxygen occluded in the three-way catalyst has been decreased to zero (or saturated) without fail, the air fuel ratio at the upstream side of the three-way catalyst is switched, and then the absolute amount of the oxygen adsorbed and held by the three-way catalyst is calculated. Accordingly, the purification rate of the three-way catalyst in a period of time in which the amount of the oxygen occluded in the three-way catalyst is being decreased to zero or saturated is reduced, thus posing a problem that the exhaust gas is deteriorated.

SUMMARY OF THE INVENTION

Accordingly, the present invention is intended to solve the problem as referred to above, and has for its object to obtain a control apparatus for an internal combustion engine which is capable of detecting the degradation of a three-way catalyst with high accuracy without causing deterioration in an exhaust gas by controlling the amount of change (i.e., the amount of occlusion or release) of the oxygen in the three-way catalyst to such an amount slightly more than the oxygen occlusion capacity of a degraded three-way catalyst specified by the relevant laws.

A control apparatus for an internal combustion engine according to the present invention includes: a three-way catalyst disposed in an exhaust system of the internal combustion engine; a first air fuel ratio detection part disposed in the exhaust system at a location upstream of the three-way catalyst for detecting a first air fuel ratio of an exhaust gas; a second air fuel ratio detection part disposed in the exhaust system at a location downstream of the three-way catalyst for detecting a second air fuel ratio of the exhaust gas; a target oxygen change amount calculation part that calculates a target oxygen change amount of the three-way catalyst; an oxygen change amount calculation part that calculates an oxygen change amount of the three-way catalyst from an amount of exhaust gas passing through the three-way catalyst and the first air fuel ratio; and an air fuel ratio operation part that inversely operates the first air fuel ratio in accordance with the oxygen change amount. The air fuel ratio operation part controls, in an inverting manner, the first air fuel ratio to a rich side and a lean side across a stoichiometric air fuel ratio with a prescribed air fuel ratio width each time the oxygen change amount in the three-way catalyst reaches the target oxygen change amount.

According to the present invention, by controlling the amount of change of the oxygen in the three-way catalyst to an amount slightly more than the oxygen occlusion capacity of the deteriorated three-way catalyst, the variation of the oxygen in the three-way catalyst, if in its normal state, does not exceed the oxygen occlusion capacity of the three-way catalyst. As a result, the oxygen concentration at the downstream side of the three-way catalyst does not vary, thus making it possible to avoid the deterioration of the exhaust gas at the downstream side of the three-way catalyst. On the other hand, if the three-way catalyst is in a deteriorated state, the variation of the oxygen in the three-way catalyst exceeds the oxygen occlusion capacity of the three-way catalyst. Consequently, the oxygen concentration at the downstream side of the three-way catalyst is inversely varied to a rich side and a lean side across the stoichiometric air fuel ratio, thus making it possible to detect the degradation of the three-way catalyst with high accuracy.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Now, a preferred embodiment of the present invention will be described below in detail while referring to the accompanying drawings.

Embodiment 1

Figure 1:
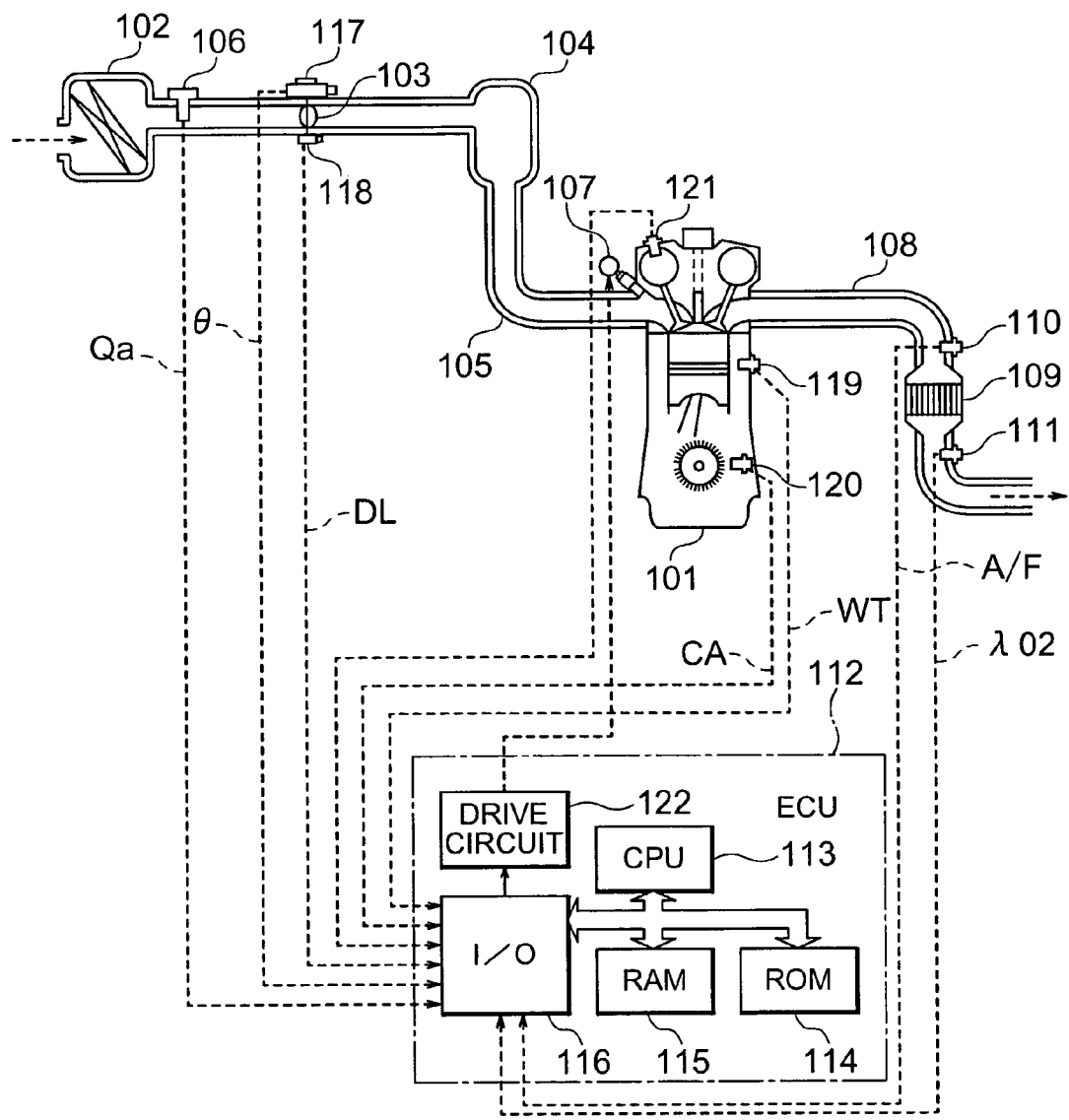
FIG. 1 is a configuration view showing a control apparatus for an internal combustion engine according to one embodiment of the present invention together with its peripheral equipment.

FIG. 1 is a block diagram that shows an entire arrangement of a control apparatus for an internal combustion engine according to one embodiment of the present invention together with its peripheral equipment.

In FIG. 1, an internal combustion engine 101 includes, as an air intake system, an intake pipe 105 having an air cleaner 102, a throttle valve 103 and a surge tank 104 install thereon.

The intake pipe 105 further includes an air flow sensor 106 for detecting the amount of intake air Qa, an injector 107 for injecting fuel into the intake pipe 105, a throttle sensor 117 for detecting the throttle opening θ of a throttle valve 103, and an idle switch 118 for detecting when the internal convention engine 101 is idling. The idle switch 118 generates an idle signal DL that becomes on at an idling opening (i.e., the throttle opening θ is in a fully closed state).

In addition, the internal combustion engine 101 further includes, as an exhaust system, an exhaust pipe 108. A three-way catalyst 109 is arranged in the exhaust pipe 108 for purifying harmful components in the exhaust gas, and a linear air fuel (A/F) ratio sensor 110 and a λ oxygen sensor 111 are arranged at an upstream side and at a downstream side, respectively, of the three-way catalyst 109.

An internal combustion engine control unit 112 (hereinafter referred to as an "ECU"), being constituted by a microcomputer, includes a central processing unit 113 (hereinafter referred to as a "CPU"), a read-only memory 114 (hereinafter referred to as a "ROM"), a random-access memory 115 (hereinafter referred to as a "RAM"), an input and output interface 116 (hereinafter referred to as an "I/O interface"), and a drive circuit 122.

The internal combustion engine 101 further includes a water temperature sensor 119 for detecting the temperature of cooling water WT, a crank angle sensor 120 four generating a crank angle signal CA corresponding to a crank angle position (i.e., the rotational angle or position of a crankshaft), and a cam angle sensor 121 for generating a cam angle signal corresponding to a cam angle position (i.e., the rotational angle or position of a camshaft).

The water temperature sensor 119, the crank angle sensor 120, and the cam angle sensor 121 together constitute various kinds of sensors for detecting the operating conditions of the internal combustion engine 101, together with other sensors (e.g., the air flow sensor 103, the linear air-fuel ratio sensor 110, the λ oxygen sensor 111, the throttle sensor 117, the idle switch 118, and so on). The respective detection signals from these sensors are input to the ECU 112 as engine operating condition information.

In the internal combustion engine 101 as shown in FIG. 1, the intake air cleaned by the air cleaner 102 is sucked into the respective engine cylinders through the surge tank 104 and the intake pipe 105 while being controlled by the throttle valve 103 into an amount corresponding to a load on the internal combustion engine 101. At this time, the amount of intake air Qa sucked into the internal combustion engine 101 is detected by the air flow sensor 106, and fuel supplied to the respective cylinders of the internal combustion engine 101 is injected into the intake pipe 105 through the injector 107.

A mixture (i.e., air and fuel) sucked into the respective cylinders of the internal combustion engine 101 is burned therein in combustion stroke and turned into an exhaust gas, which is then exhausted into the ambient atmosphere through the three-way catalyst 109 arranged on the exhaust pipe 108 while the harmful components in the exhaust gas are purified by the three-way catalyst 109.

At this time, the linear A/F sensor 110 arranged at the upstream side of the three-way catalyst 109 detects the air fuel ratio A/F of the mixture by linearly detecting an oxygen concentration in the exhaust gas at the upstream side of the three-way catalyst 109. The λ oxygen sensor 111 arranged at the downstream side of the three-way catalyst 109 detects an oxygen concentration λO2 in the exhaust gas at the downstream side of the three-way catalyst 109. The detection signals of the respective sensors 110, 111 contribute to the detection processing of the states of the exhaust gas upstream and downstream of the three-way catalyst 109 according to the ECU 112.

In the ECU 112, various pieces of operating condition information (e.g., the amount of intake air Qa, the throttle opening θ, the idle signal DL, the cooling water temperature WT, the air fuel ratio A/F, the oxygen concentration λO2, the crank angle signal CA, the cam angle signal from the cam angle sensor 121, etc.) are taken into the CPU 113 through the I/O interface 116.

The ECU 112 constitutes an air fuel ratio feedback control system which generates a drive signal for the injector 107 based on the air fuel ratio A/F and the oxygen concentration λO2 from the respective sensors 110, 111 arranged before and after (upstream and downstream of) the three-way catalyst 109, so that a required amount of fuel can be injected by the injector 107.

In the air fuel ratio feedback control system in the ECU 112, the CPU 113 drives the injector 107 through the drive circuit 122 in such a manner that the internal combustion engine 101 can be operated in a predetermined air fuel ratio on the basis of a control program and various maps stored in the ROM 114. The actual air fuel ratio (A/F) is controlled to a target air fuel ratio A/Fo according to this air fuel ratio feedback control.

Here, note that the ECU 112 also functions as a degradation detection device for the three-way catalyst 109 so as to control the internal combustion engine 101 at an optimal manner, as will be described later. In addition, the drive circuit 122 in the ECU 112 drives not only the injector 107 but also various kinds of actuators such as, for instance, an ISC valve (not shown), associated with the internal combustion engine 101.

That is, the ECU 112 performs, in addition to the air fuel ratio control, various kinds of control such as ignition timing control, idling speed control, etc., and at the same time detects, as a self-diagnosis function, failure of various kinds of components from which deterioration in the exhaust gas results.

The CPU 113 and the drive circuit 122, which serve to drive the injector 107 in a controlled manner, together constitute an air fuel ratio operation part which controls, in an inverting manner, the air fuel ratio A/F to a rich side and a lean side across the stoichiometric air fuel ratio with a prescribed width of the air fuel ratio each time the amount of change of the oxygen in the three-way catalyst 109 reaches a target oxygen change amount.

Moreover, the ROM 114 stores therein not only a routine for controlling the amount of change of the oxygen in the three-way catalyst 109, but also control programs such as a degradation detection routine for the three-way catalyst 109, etc., along with necessary maps for these control processes.

Hereinafter, the control apparatus for an internal combustion engine according to the this embodiment of the present invention shown in FIG. 1 will be described in detail while referring to flow charts of FIGS. 2, 3, timing charts of FIGS. 4, 5 and an explanatory view of FIG. 6. Here, the description will be made along the contents of processing according to a control routine for controlling the amount of change of the oxygen in the three-way catalyst 109 as well as a degradation detection routine for detecting the degradation of the three-way catalyst 109, these routines featuring the present invention.

Figure 2:
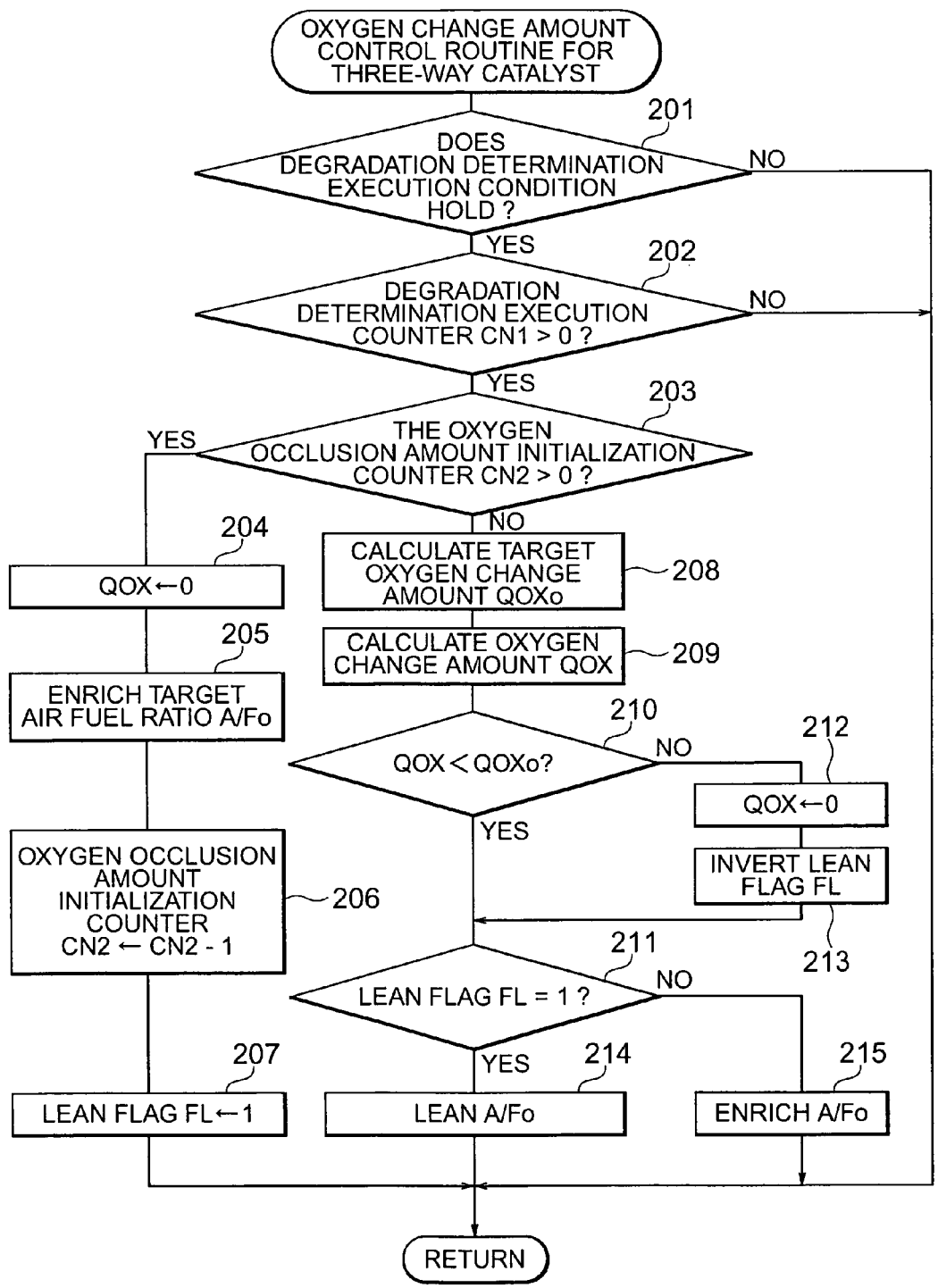
FIG. 2 is a flow chart illustrating an oxygen change amount control routine for a three-way catalyst for purification of an exhaust gas according to this embodiment of the present invention.

FIG. 2 is a flow chart that illustrates an air fuel ratio control routine, which is the control routine for controlling the amount of change of the oxygen in the three-way catalyst 109 for purification of an exhaust gas, according to the this embodiment of the present invention.

In FIG. 2, first of all, it is determined whether a degradation determination execution condition for the three-way catalyst 109 holds (step 201). When it is determined that the degradation determination execution condition does not hold (that is, NO), the processing routine of FIG. 2 is immediately terminated and a return is performed.

On the other hand, when it is determined in step 201 that the degradation determination execution condition holds (that is, YES), it is subsequently determined whether the value of a degradation determination execution counter CN1 is greater than "0" (step 202). When it is determined as CN1=0 (that is, NO), a predetermined number of degradation determination executions have been completed, so the processing routine of FIG. 2 is terminated at once and a return is carried out.

At this time, it is assumed that only when the degradation determination execution condition holds for the first time (step 201), the degradation determination execution counter CN1 and an oxygen occlusion amount initialization counter CN2 are set to initial values, respectively. In addition, it can be determined that the degradation determination execution condition holds, for example, when the following conditions are satisfied: that is, the internal combustion engine 101 is after warmed up; the amount of intake air Qa is in a predetermined range; and the number of revolutions per minute and the load of the engine are in predetermined ranges, respectively.

The degradation determination execution counter CN1 is a subtraction counter which is decremented by "1" each time a lean flag FL (to be described later) is switched. Accordingly, if the initial value of the degradation determination execution counter CN1 is set to "5", for example, the target air fuel ratio A/Fo, after first enriched, is controlled to be made lean and rich in an alternate manner. Such enriching and leaning are carried out a total of five times.

On the other hand, when it is determined as CN1>0 in step 202 (that is, YES), it is subsequently determined whether the value of the oxygen occlusion amount initialization counter CN2 is greater than "0" (step 203).

The oxygen occlusion amount initialization counter CN2 is a subtraction counter which is decremented by "1" each time the processing of enriching the target air fuel ratio A/Fo is carried out during the initialization of the amount of oxygen occlusion (to be described later). In this case, by making the target air fuel ratio A/Fo richer than the stoichiometric air fuel ratio over a predetermined period of time, it is possible to suppress deterioration in the amount of NOx emission resulting from the oxygen occlusion capacity of the three-way catalyst 109 being saturated by the amount of oxygen in the three-way catalyst 109 in the lean processing of the target air fuel ratio A/Fo executed when the value of the oxygen occlusion amount initialization counter CN2 is "0".

When it is determined as CN2>0 in step 203 (that is, YES), the amount of change of the oxygen QOX in the three-way catalyst 109 is set to "0" (step 204), and the target air fuel ratio A/Fo is enriched by a predetermined amount from the stoichiometric air fuel ratio based on a map that is set in accordance with the number of revolutions per minute and the load of the internal combustion engine 101 (step 205).

Also, the oxygen occlusion amount initialization counter CN2 is decremented by "1" (step 206), and the lean flag FL is set to "1 (hold)" in preparation for the post termination of the initialization of the amount of change of the oxygen QOX in the three-way catalyst 109, after which the processing routine of FIG. 2 is ended. If the lean flag FL is set to "1(hold)" after the termination of the initialization of the oxygen occlusion amount, the target air fuel ratio A/Fo is made lean, whereas if the lean flag FL is cleared to "0 (not hold)", it functions as a determination flag to enrich the target air fuel ratio A/Fo.

On the other hand, if it is determined as CN2=0 (that is, NO) in step 203, the target oxygen change amount QOXo is obtained by arithmetic calculations (step 208). Here, note that the target oxygen change amount QOXo is set to a value that is equal to the oxygen occlusion capacity of the three-way catalyst 109, at which the catalyst 109 should be detected as degraded according to the relevant laws, added by a predetermined amount of margin (e.g., about 20%).

Figure 6:
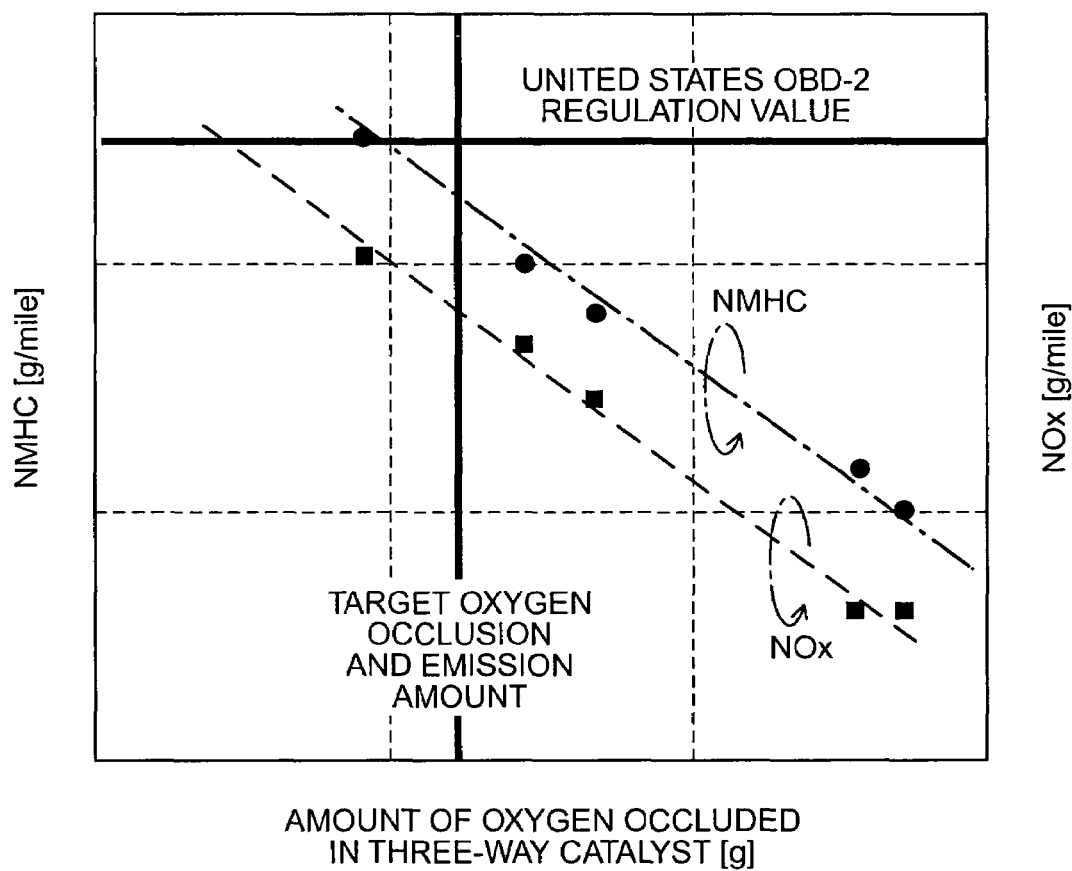
FIG. 6 is a view illustrating a relation between the oxygen occlusion capacity of the three-way catalyst and the amount of exhaust gas emission during travelling in a US FTP mode when the three-way catalyst is degraded.

FIG. 6 is an explanatory view that illustrates a relation between the oxygen occlusion capacity [g] at the time when the three-way catalyst 109 is degraded and the amount of exhaust gas emission at the time of travelling in a US FTP (Federal Test Procedure: Exhaust Gas Measuring Procedure) mode, wherein an alternate long and short dash line indicates NMHC (Non-Methane Hydro Carbon: HCs other than methane), and a broken line indicates an amount of NOx emission. In FIG. 6, a regulation value (with respect to a self-diagnosis function for emission failure) according to the United States OBD (On Board Diagnosis)-2 is defined in such a manner that a failure should be detected when the amount of exhaust gas emission at the time of travelling in the US FTP mode exceeds a predetermined times of an emission regulation value.

Here, the oxygen occlusion capacity of the three-way catalyst 109, at which the degradation of the catalyst 109 should be detected, is set so as to satisfy the United States OBD-2 regulation value. Here, it is assumed that characteristic data of FIG. 6 is stored in the ROM 114 in the ECU 112. Thus, when the target oxygen change amount QOXo is calculated in step 208, the amount of change of the oxygen QOX in the three-way catalyst 109 is subsequently calculated by the following expression (1) (step 209).

$$QOX = QOX(\text{last value}) + |A/F - A/Fb| \div A/Fb \times Qa \times \Delta T \times \alpha \quad (1)$$

where $\Delta T$ is a calculation period or cycle of the oxygen change amount QOX; $\alpha$ is an oxygen amount conversion factor; and A/Fb is a basic target air fuel ratio. The basic target air fuel ratio A/Fb is a target air fuel ratio which is set when the air fuel ratio of the mixture is not made rich or lean, and which is a stoichiometric air fuel ratio corresponding to a driving operation point of the internal combustion engine 101. Further, it is assumed that the amount of intake air Qa is substantially equal to the amount of gas that has passed the three-way catalyst 109.

After the oxygen change amount QOX is calculated according to expression (1) above in step 209, it is subsequently determined whether the oxygen change amount QOX is smaller than the target oxygen change amount QOXo (step 210). When it is determined as QOX≧QOXo in step 210 (that is, NO), the oxygen change amount QOX reaches the target oxygen change amount QOXo. Accordingly, the oxygen change amount QOX is set to "0" (step 212), the lean flag FL is inverted (e.g., from "1 (hold)" to "0 (not hold)") (step 213), and the control flow proceeds to step 211.

On the other hand, when it is determined as QOX<QOXo in step 210 (that is, YES), it is subsequently determined whether the lean flag FL is set as "1 (hold)" (step 211). When it is determined as FL=1 in step 211 (that is, YES), the target air fuel ratio A/Fo is increased or made leaner by a predetermined amount (e.g., 0.4) than the basic target air fuel ratio A/Fb (step 214), and the processing routine of FIG. 2 is terminated.

On the other hand, when it is determined as FL=0 in step 211 (that is, NO), the target air fuel ratio A/Fo is decreased or made richer by a predetermined amount (e.g., 0.4) than the basic target air fuel ratio A/Fb (step 215), and the processing routine of FIG. 2 is terminated.

Figure 3:
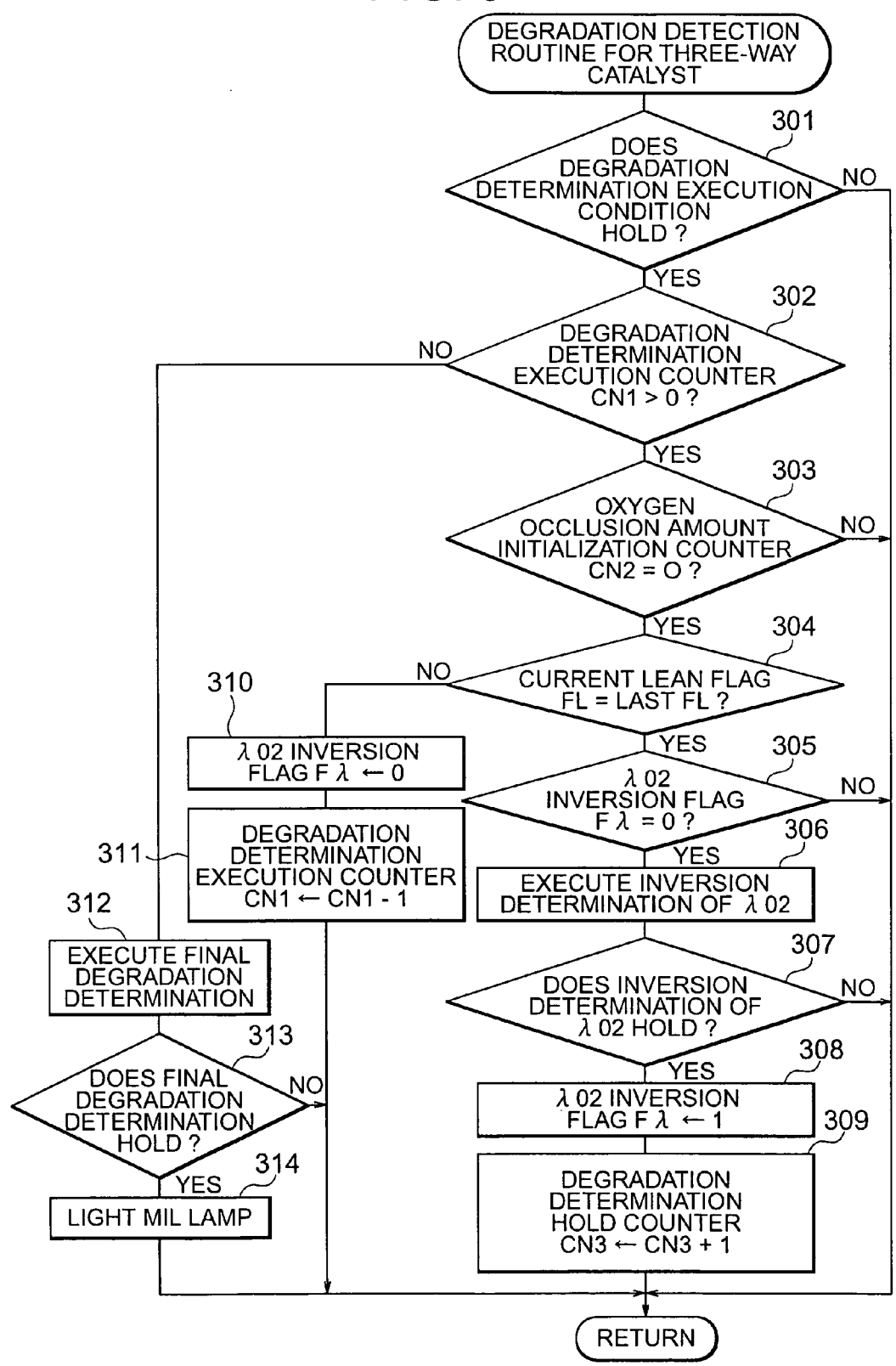
FIG. 3 is a flow chart illustrating a degradation detection routine for the three-way catalyst according to this embodiment of the present invention.

FIG. 3 is a flow chart that illustrates a routine for detecting the degradation of the three-way catalyst 109 according to the this embodiment of the present invention. In FIG. 3, first of all, it is determined whether the degradation determination execution condition holds (step 301), and when it is determined that the degradation determination execution condition does not hold (that is, NO), the processing routine of FIG. 3 is immediately terminated and a return is performed.

On the other hand, when it is determined in step 301 that the degradation determination execution condition holds (that is, YES), it is subsequently determined whether the value of the degradation determination execution counter CN1 is greater than "0" (step 302), and when determined as CN1=0 (that is, NO), the control flow advances to step 312 (to be described later).

When it is determined as CN1>0 in step 302 (that is, YES), it is subsequently determined whether the value of the oxygen occlusion amount initialization counter CN2 is greater than "0" (step 303), and when determined as CN2>0 (that is, NO), the processing routine of FIG. 3 is terminated at once, whereas when determined as CN2=0 in step 303 (that is, YES), it is subsequently determined whether the lean flag FL is the same as the last value (step 304), and when determined that the current FL is not equal to the last FL (that is, NO), the control flow advances to step 310 (to be described later).

On the other hand, when it is determined in step 304 that the current FL is equal to the last FL (that is, YES), it is subsequently determined whether a λO2 inversion flag Fλ downstream of the three-way catalyst 109 is equal to "0 (not hold)" (step 305), and when determined that the degradation determination execution condition does not hold (that is, NO), the processing routine of FIG. 3 is immediately terminated.

When it is determined as Fλ=0 in step 305 (that is, YES), inversion determination processing for the oxygen concentration λO2 detected by the λ oxygen sensor 111 is carried out (step 306). Specifically, it is determined whether the output value of the λ oxygen sensor 111 downstream of the three-way catalyst 109 is lower than a lean inversion threshold value during the lean processing of the target air fuel ratio A/Fo, or it is determined whether the output value of the λ oxygen sensor 111 downstream of the three-way catalyst 109 exceeds a rich inversion threshold value during the rich processing of the target air fuel ratio A/Fo.

Here, note that when the value of the oxygen occlusion amount initialization counter CN2 is greater than zero (i.e., CN2>0), the λO2 inversion flag Fλ downstream of the three-way catalyst 109 is set to "0 (not hold)", and in case of CN2=0, the λO2 inversion flag Fλ downstream of the three-way catalyst 109 is set to "1 (hold)" if it becomes less than the lean inversion threshold value when inverted (i.e., at the time of the lean processing of the target air fuel ratio A/Fo), or if it becomes greater than the rich inversion threshold value at the time of the rich processing of the target air fuel ratio A/Fo. In addition, the lean inversion threshold value is set to 0.3 [V] for instance, and the rich inversion threshold value is set to 0.7 [V], for instance.

Then, by detecting the timing at which the inversion determination holds in step 306, it is determined whether the inversion determination of the oxygen concentration λO2 holds (step 307), and when determined that the inversion determination of the oxygen concentration λO2 does not hold (that is, NO), the processing routine of FIG. 3 is immediately terminated.

On the other hand, when it is determined in step 307 that the inversion determination of the oxygen concentration λO2 holds (that is, YES), it is further determined whether the λO2 inversion flag Fλ downstream of the three-way catalyst 109 is set to "1 (hold)" (step 308), and a degradation determination hold counter CN3 is incremented (i.e., added by "1")(step 309), after which the processing routine of FIG. 3 is terminated.

Here, note that each time the output value of the λ oxygen sensor 111 downstream of the three-way catalyst 109 is inverted, the degradation determination hold counter CN3 is incremented by "1", and when the degradation determination execution counter CN1 (e.g., initial value=5) becomes "0", a final degradation determination (to be described later) holds if the value of the degradation determination hold counter CN3 becomes equal to or greater than "4".

On the other hand, when in step 304 the lean flag FL is inverted and hence it is determined that the current FL is not equal to the last FL (that is, NO), the λO2 inversion flag Fλ downstream of the three-way catalyst 109 is set to "0 (not hold)" (step 310), and the degradation determination execution counter CN1 is subtracted or decremented (step 311), after which the processing routine of FIG. 3 is terminated.

Further, when it is determined in the above step 302 that the degradation determination execution counter CN1 is equal to zero (CN1=0) (that is, NO), final degradation determination processing is carried out in which it is determined whether the degradation determination hold counter CN3 exceeds a final degradation determination threshold value (preset in the ROM 114) (step 312).

Subsequently, in step 313, it is determined whether the degradation determination execution condition holds in step 312, and when the degradation determination hold counter CN3 is less than 4 (i.e., CN3<4) and hence it is determined that the degradation determination execution condition does not hold (that is, NO), the processing routine of FIG. 3 is immediately terminated. On the other hand, when in step 313 the degradation determination hold counter CN3 is equal to or greater than 4 (i.e., CN3≧4) and hence it is determined that the final degradation determination holds (that is, YES), a MIL (Malfunction Indicator Light) lamp is lit so as to inform the driver of the fact that the three-way catalyst 109 is in its deteriorated state (step 314), and the processing routine of FIG. 3 is terminated.

Figure 4:
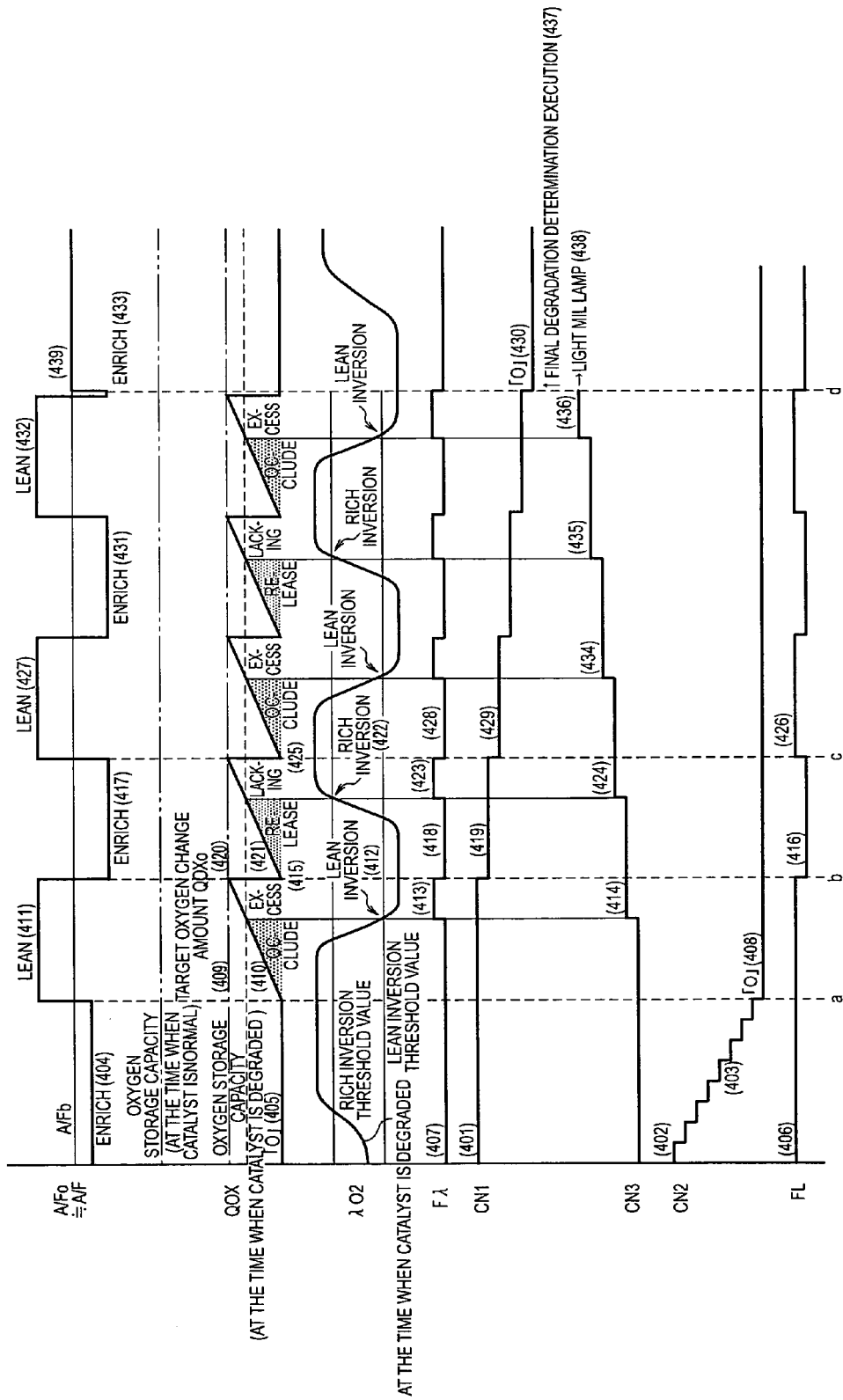
FIG. 4 is a timing chart illustrating the operation of a three-way catalyst degradation detection device when the three-way catalyst is in a normal state, according to this embodiment of the present invention.
Figure 5:
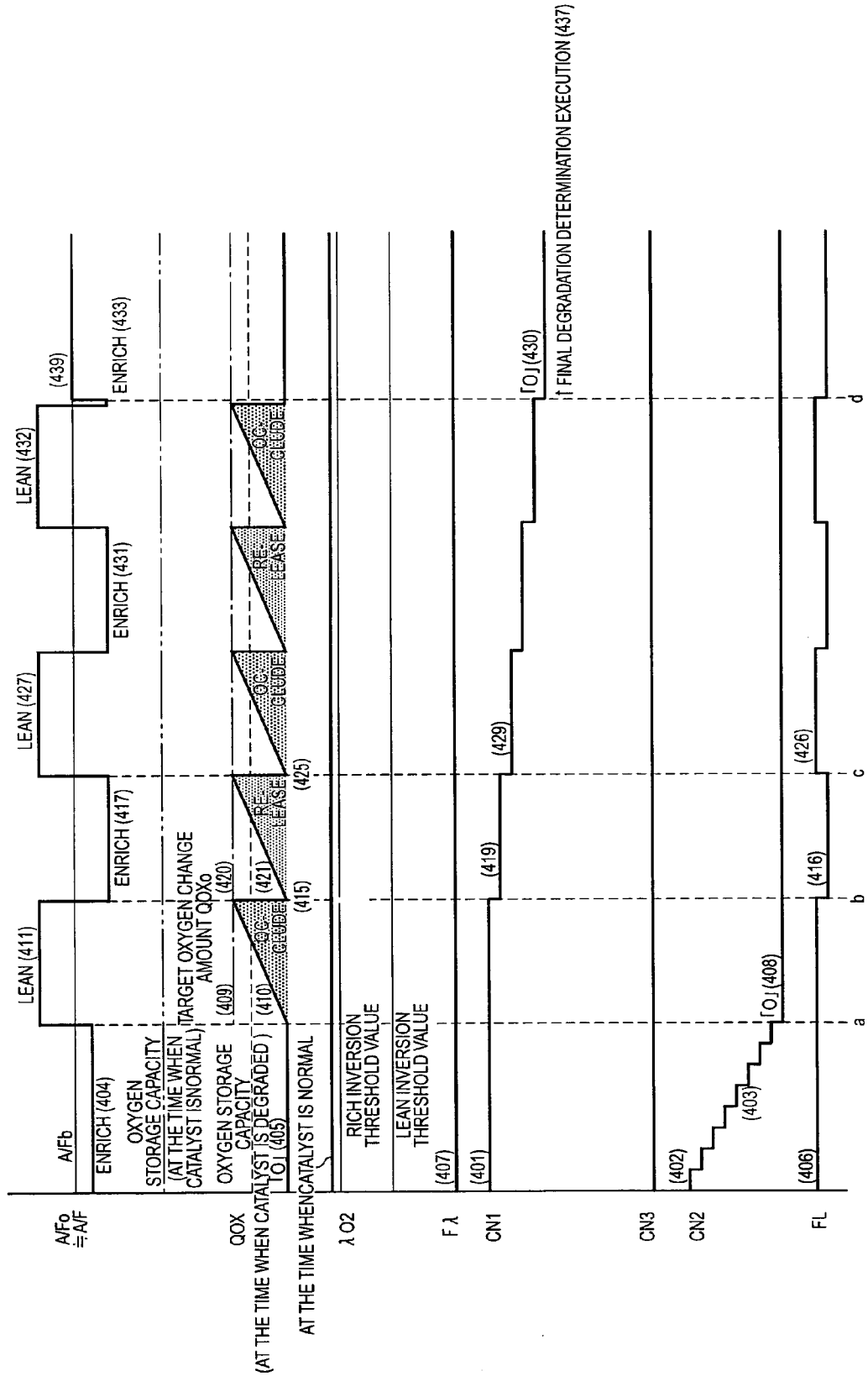
FIG. 5 is a timing chart illustrating the operation of the three-way catalyst degradation detection device when the three-way catalyst is in a degraded state, according to this embodiment of the present invention.

FIG. 4 and FIG. 5 are timing charts that illustrate the operation of the degradation detection device for detecting the degradation of the three-way catalyst 109 according to the this embodiment of the present invention, wherein FIG. 4 shows an operation when it should be detected that the three-way catalyst 109 has been deteriorated, and FIG. 5 shows an operation when the three-way catalyst 109 is normal.

In FIG. 4 and FIG. 5, there are illustrated the time-related changes in the respective values of the target air fuel ratio A/Fo (≈A/F at the upstream side of the three-way catalyst 109), the oxygen change amount QOX, the oxygen concentration λO2, the downstream λO2 inversion flag F λ, the degradation determination execution counter CN1, the oxygen occlusion amount initialization counter CN2, the degradation determination hold counter CN3, and the lean flag FL.

Hereinafter, reference will be made to the specific contents of processing of the oxygen change amount control routine and the degradation detection routine for the three-way catalyst 109 as stated above along respective steps 401 through 439 while referring to FIG. 4.

In FIG. 4, when the degradation determination execution condition holds by a first time point a, initial values are set in the degradation determination execution counter CN1 and the oxygen occlusion amount initialization counter CN2, respectively (steps 401, 402), and in step 404, the target air fuel ratio A/Fo is enriched until the value of the oxygen occlusion amount initialization counter CN2 becomes "0" (steps 403 through 408).

In the enriching period by the first time point a, the oxygen change amount QOX is set to "0" (step 405), and the lean flag FL is set to "1" (step 406), and the λO2 inversion flag Fλ downstream of the three-way catalyst 109 is fixed to "0" (step 407).

Subsequently, when the oxygen occlusion amount initialization counter CN2 becomes "0" within a period from time point a to time point b (step 408), the target oxygen change amount QOXo is calculated (step 409), and the oxygen change amount QOX is also calculated (step 410). Hereinafter, the target air fuel ratio A/Fo is made leaner until the oxygen change amount QOX reaches the target oxygen change amount QOXo (step 411).

When the output value λO2 (oxygen concentration) of the λ oxygen sensor 111 downstream of the three-way catalyst 109 falls below the lean inversion threshold value within the above-mentioned period from time point a to time point b (step 412), the λO2 inversion flag Fλ downstream of the three-way catalyst 109 is set to "1" (step 413), and the degradation determination hold counter CN3 is incremented (step 414).

Hereinafter, when the oxygen change amount QOX reaches the target oxygen change amount QOXo at time point b as shown in FIG. 5, the oxygen change amount QOX is set to "0" (step 415), and the lean flag FL is set "0" (step 416), and the target air fuel ratio A/Fo is made richer. At the same time, the λO2 inversion flag F λ downstream of the three-way catalyst 109 is set to "0" (step 418), and the degradation determination execution counter CN1 is decremented (step 419).

Subsequently, the target oxygen change amount QOXo and the oxygen change amount QOX are calculated within a period from time point b to time point c, similar to the period from time point a to time point b (steps 420, 421). Thereafter, the target air fuel ratio A/Fo is made richer until the oxygen change amount QOX reaches the target oxygen change amount QOXo (step 417).

When the output value λO2 (oxygen concentration) of the λ oxygen sensor 111 downstream of the three-way catalyst 109 exceeds the rich inversion threshold value within the period from time point b to time point c (step 422), the λO2 inversion flag F λ is set to "1" (step 423), and the degradation determination hold counter CN3 is incremented (step 424).

Hereinafter, when the oxygen change amount QOX reaches the target oxygen change amount QOXo at time point c as shown in FIG. 5, the oxygen change amount QOX is set to "0" (step 425), and the lean flag FL is set to "1" (step 426), and the target air fuel ratio A/Fo is made leaner (step 427). At the same time, the λO2 inversion flag F λ downstream of the three-way catalyst 109 is set to "0" (step 428), and the degradation determination execution counter CN1 is decremented (step 429).

Subsequently, the target air fuel ratio A/Fo is repeatedly made leaner and richer in an alternate manner (steps 427, 431, 432, 433) until the value of the degradation determination execution counter CN1 becomes "0" (step 430) within a period from time point c to time point d, similar to the period from time point a to time point c, and the degradation determination hold counter CN3 is incremented each time the λO2 inversion flag F λ is set to "1" (steps 434, 435, 436).

Hereinafter, when the degradation determination execution counter CN1 reaches "0" at time point d (step 430), as shown in FIG. 5, the final degradation determination is executed (step 437). At this time, when the final degradation determination holds, the MIL lamp is lit (step 438), and the degradation detection routine for the three-way catalyst 109 is completed.

In addition, the target air fuel ratio A/Fo is set to the basic target air fuel ratio A/Fb, and the oxygen change amount control routine for the three-way catalyst 109 is completed (step 439). In FIG. 4, the operation at the time of the degradation detection of the three-way catalyst 109 is illustrated, and the oxygen concentration λO2 downstream of the three-way catalyst 109 alternately indicates an oxygen occlusion excess state and an oxygen release shortage state for the oxygen change amount QOX.

On the other hand, the respective operation sequences or steps 401 through 439 in FIG. 5 (at the time of normal operation) are similar to those in the case of FIG. 4 (at the time of degradation detection), but since the three-way catalyst 109 is normal, the output value λO2 (oxygen concentration) of the λ oxygen sensor 111 downstream of the three-way catalyst 109 is not inverted within the period until time point d, so the degradation determination hold counter CN3 is not incremented. Also, the oxygen concentration λO2 downstream of the three-way catalyst 109 continuously indicates a normal value, so at time point d, the final degradation determination becomes "not hold", and the MIL lamp is accordingly not lit.

As described above, the control apparatus for an internal combustion engine according to the this embodiment of the present invention comprises, as shown in FIG. 1, the three-way catalyst 109 that is arranged in the exhaust system of the internal combustion engine 101, air fuel ratio detection parts 110, 111 that are arranged at the upstream side and at the downstream side, respectively, of the three-way catalyst 109 for detecting an air fuel ratio in an exhaust gas, and the ECU 112 that includes a target oxygen change amount calculation part, an oxygen change amount calculation part and an air fuel ratio operation part.

In the ECU 112, the target oxygen change amount calculation part calculates a target oxygen change amount, and the oxygen change amount calculation part calculates the amount of change of the oxygen in the three-way catalyst 109 based on the amount of gas having passed through the three-way catalyst 109 (the amount of intake air Qa) and the air fuel ratio A/F upstream of the three-way catalyst 109.

In addition, the air fuel ratio operation part controls, in an inverting manner, the air fuel ratio A/F at the upstream side of the three-way catalyst 109 to a rich side and a lean side across the stoichiometric air fuel ratio with a prescribed width of the air fuel ratio each time the amount of change of the oxygen in the three-way catalyst 109 reaches the target oxygen change amount. Moreover, the air fuel ratio operation part controls the air fuel ratio at the upstream side of the three-way catalyst 109 to a prescribed air fuel ratio, which is at a side richer than the stoichiometric air fuel ratio, over a predetermined period of time prior to the start of the operation of the air fuel ratio upstream of the three-way catalyst 109 based on the target oxygen change amount.

By controlling the amount of change of the oxygen in the three-way catalyst 109 to an amount slightly more than the oxygen occlusion capacity of the deteriorated three-way catalyst 109, the variation of the oxygen in the three-way catalyst 109, if in its normal state, does not exceed the oxygen occlusion capacity of the three-way catalyst 109. As a result, the oxygen concentration λO2 at the downstream side of the three-way catalyst 109 does not vary, thus making it possible to avoid deterioration of the exhaust gas at the downstream side of the three-way catalyst 109. On the other hand, if the three-way catalyst 109 is in a deteriorated state, the variation of the oxygen in the three-way catalyst exceeds the oxygen occlusion capacity of the three-way catalyst 109. Consequently, the oxygen concentration λO2 at the downstream side of the three-way catalyst 109 is inversely varied to a rich side and a lean side across the stoichiometric air fuel ratio, thus making it possible to detect the degradation of the three-way catalyst 109 with high accuracy.

Further, by making the air fuel ratio at the upstream side of the three-way catalyst 109 richer than the stoichiometric air fuel ratio over a predetermined period of time prior to the start of the operation of the air fuel ratio upstream of the three-way catalyst 109 based on the target oxygen change amount, it is possible to control the amount of change of the oxygen in the three-way catalyst 109 within a range in which the amount of oxygen occluded in the three-way catalyst 109 does not saturate the oxygen occlusion capacity thereof, thus making it possible to prevent deterioration in the amount of NOx emission.

Although in the this embodiment of the present invention, the relatively inexpensive λ oxygen sensor 111 is arranged at the downstream side of the three-way catalyst 109, the present invention is not limited to this, but for example, a linear A/F sensor may be arranged in place of the λ oxygen sensor 111 so as to improve the control accuracy for the air fuel ratio. In addition, although inversion of the output value λO2 (oxygen concentration) of the λ oxygen sensor 111 at the downstream side of the three-way catalyst 109 is used as a degradation determination reference for the three-way catalyst 109, the present invention is not limited to this, but for example, an inversion frequency ratio between the respective output values of the sensors arranged at the upstream side and at the downstream side, respectively, of the three-way catalyst 109 may instead be used.

While the invention has been described in terms of a preferred embodiment, those skilled in the art will recognize that the invention can be practiced with modifications within the spirit and scope of the appended claims.

What is claimed is:

1. A control apparatus for an internal combustion engine comprising:
    a three-way catalyst disposed in an exhaust system of said internal combustion engine;
    a first air fuel ratio detection part disposed in said exhaust system at a location upstream of said three-way catalyst for detecting a first air fuel ratio of an exhaust gas;
    a second air fuel ratio detection part disposed in said exhaust system at a location downstream of said three-way catalyst for detecting a second air fuel ratio of said exhaust gas;

a target oxygen change amount calculation part that calculates a target oxygen change amount of said three-way catalyst;

an oxygen change amount calculation part that calculates an oxygen change amount of said three-way catalyst from an amount of exhaust gas passing through said three-way catalyst and said first air fuel ratio; and an air fuel ratio operation part that inversely operates said first air fuel ratio in accordance with said oxygen change amount;

wherein said air fuel ratio operation part controls, in an inverting manner, said first air fuel ratio to a rich side and a lean side across a stoichiometric air fuel ratio with a prescribed air fuel ratio width each time said oxygen change amount in said three-way catalyst reaches said target oxygen change amount.

2. The control apparatus for an internal combustion engine as set forth in claim 1, wherein said air fuel ratio operation part controls, before starting to inversely operate said first air fuel ratio, said first air fuel ratio to a predetermined air fuel ratio which is preset to a value richer than said stoichiometric air fuel ratio, over a predetermined period of time.

* * * * *